(12) United States Patent
Jeong

(10) Patent No.: US 9,516,231 B2
(45) Date of Patent: Dec. 6, 2016

(54) CAMERA MODULE

(71) Applicant: Seong Cheol Jeong, Seoul (KR)

(72) Inventor: Seong Cheol Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/355,181

(22) PCT Filed: Oct. 22, 2012

(86) PCT No.: PCT/KR2012/008644
§ 371 (c)(1),
(2) Date: Apr. 29, 2014

(87) PCT Pub. No.: WO2013/065980
PCT Pub. Date: May 10, 2013

(65) Prior Publication Data
US 2014/0285678 A1  Sep. 25, 2014

(30) Foreign Application Priority Data

Oct. 31, 2011 (KR) .................. 10-2011-0112213

(51) Int. Cl.
| | | |
|---|---|---|
| H04N 5/232 | (2006.01) | |
| H04N 5/225 | (2006.01) | |
| G02B 27/64 | (2006.01) | |
| G03B 5/00 | (2006.01) | |
| G03B 17/04 | (2006.01) | |

(52) U.S. Cl.
CPC .......... *H04N 5/2328* (2013.01); *G02B 27/646* (2013.01); *G03B 5/00* (2013.01); *H04N 5/2257* (2013.01); *H04N 5/23287* (2013.01); *G03B 17/04* (2013.01)

(58) Field of Classification Search
CPC .......... H04N 5/23264; H04N 5/2328; H04N 5/2251–5/2254
USPC ....................................... 348/208.99
See application file for complete search history.

(56) References Cited

U.S. PATENT DOCUMENTS

| | | | |
|---|---|---|---|
| 6,313,456 B1 * | 11/2001 | Miyashita et al. ......... 250/208.1 |
| 2003/0016300 A1 * | 1/2003 | Ting .............................. 348/335 |
| 2008/0074744 A1 * | 3/2008 | Osaka .................. G02B 27/646 |
| | | | 359/554 |
| 2010/0091120 A1 * | 4/2010 | Nagata et al. ............. 348/208.4 |
| 2013/0182325 A1 * | 7/2013 | Minamisawa ........... G03B 5/00 |
| | | | 359/554 |

FOREIGN PATENT DOCUMENTS

| | | |
|---|---|---|
| JP | 2009-181082 A | 8/2009 |
| JP | 2010-096862 A | 4/2010 |

(Continued)

OTHER PUBLICATIONS

International Search Report in International Application No. PCT/KR2012/008644, filed Oct. 22, 2012.
Office Action dated Mar. 16, 2016 in Taiwanese Application No. 101139522.

*Primary Examiner* — Anthony J Daniels
(74) *Attorney, Agent, or Firm* — Saliwanchik, Lloyd & Eisenschenk

(57) ABSTRACT

The present invention relates to a camera module, the camera module including a camera body including a handshake correction unit configured to correct an image shake caused by handshake, and an FPCB (Flexible Printed Circuit Board) including a first connection unit connected to the camera body, a second connection unit connected to the first connection unit by being folded, and a third connection unit connected to the second connection unit by being folded.

12 Claims, 2 Drawing Sheets

(56) References Cited

FOREIGN PATENT DOCUMENTS

| KR | 10-2010-0035386 A | 4/2010 |
| KR | 10-2011-0056112 A | 5/2011 |
| TW | 200507587 A | 2/2005 |
| TW | 200813594 A | 3/2008 |

\* cited by examiner

CAMERA MODULE

CROSS-REFERENCE TO RELATED APPLICATIONS

This application is the U.S. national stage application of International Patent Application No. PCT/KR2012/008644, filed Oct. 22, 2012, which claims priority to Korean Application No. 10-2011-0112213, filed Oct. 31, 2011, the disclosures of each of which are incorporated herein by reference in their entirety.

TECHNICAL FIELD

The exemplary and non-limiting embodiments of this invention relate generally to a camera module.

BACKGROUND ART

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Concomitant with a wide popularity of image capturing devices such as digital still cameras and digital video cameras, a consumer demand gradually increases on capture of a higher quality of photographs and video images. Recently, application of a handshake correction apparatus on image capturing devices has increased to prevent resolution of pictures from being decreased by a user handshake.

The handshake correction apparatus is applied to a camera module photographing a subject, and corrects camera shake caused by handshake or external shock by moving an optical lens or an image sensor such as a Charge Coupled Device (CCD) and a Complementary Metal-Oxide Semiconductor (CMOS) sensor.

Many researches are being waged on the handshake correction devices through using various structures and methods.

DISCLOSURE OF INVENTION

Technical Problem

Accordingly, the present invention has been made keeping in mind the above disadvantages/problems occurring in the prior art, and the present invention is to provide a camera module configured to enable a smooth driving of an OIS (Optical Image Stabilizer) function.

Technical problems to be solved by the present invention are not restricted to the above-mentioned, and any other technical problems not mentioned so far will be clearly appreciated from the following description by skilled in the art.

Solution to Problem

The below Technical Solution section is intended to be merely exemplary and non-limiting.

In one general aspect of the present invention, there is provided a camera module, the camera module comprising: a camera body including a handshake correction unit configured to correct an image shake caused by handshake; and an FPCB (Flexible Printed Circuit Board) including a first connection unit connected to the camera body, a second connection unit connected to the first connection unit by being folded, and a third connection unit connected to the second connection unit by being folded.

In some exemplary embodiments, the first, second and third connection units may be folded at a bottom surface of the camera body.

In some exemplary embodiments, the handshake correction unit may include a driving unit correcting the image shake by tilting the camera body.

In some exemplary embodiments, the camera module further comprises: a case wrapping the camera body: and a driving unit installed on the camera body and the case to tilt the camera body, wherein the camera body is embedded with a lens and an image sensor.

In some exemplary embodiments, the driving unit may tilt the camera body by electromagnetic interaction.

In some exemplary embodiments, the camera module may further comprise an elastic unit restoring the camera body to an original position in a case the electromagnetic interaction of the driving unit disappears.

In some exemplary embodiments, the elastic unit may be connected to the camera module and the case.

In some exemplary embodiments, the elastic unit may be a wire spring or a leaf spring.

In some exemplary embodiments, the camera body may be formed at a center of a bottom surface with a groove, where a structure inserted into the groove may be formed at the case.

In some exemplary embodiments, the driving unit may include a magnet installed at an external wall of the camera body, and a coil distanced from the magnet to be wound on the case.

In some exemplary embodiments, the driving unit may include a first driving unit tilting the camera body to a first axis, and a second driving unit tilting the camera body to a second axis.

In some exemplary embodiments, a bottom surface of the second connection unit may be so folded as to face a bottom surface of the first connection unit, and a bottom surface of the third connection unit may be so folded as to face the bottom surface of the second connection unit.

In some exemplary embodiments, the bottom surface of the second connection unit may be so folded as to face the bottom surface of the first connection unit, and an upper surface of the third connection unit may be so folded as to face an upper surface of the second connection unit.

In some exemplary embodiments, the third connection unit may be electrically connected to an external device or an external board.

In some exemplary embodiments, the FPCB may include a coating material arranged with a plurality of electrode lines and wrapping the plurality of electrode lines.

In some exemplary embodiments, the coating material may be formed with well-foldable grooves.

In some exemplary embodiments, the grooves are positioned among the plurality of electrode lines.

In another general aspect of the present invention, there is provided a camera module, the camera module comprising: a camera body including a handshake correction unit configured to correct an image shake caused by handshake; and an FPCB (Flexible Printed Circuit Board) including a connection unit connected to the camera body and formed with an area folded for reducing rigidity.

In some exemplary embodiments, the folded area is positioned at a bottom surface of the camera body.

In some exemplary embodiments, the handshake correction unit includes a driving unit correcting the handshake by tilting the camera body.

Advantageous Effects of Invention

A camera module according to the present invention has an advantageous effect in that a handshake correction unit is mounted to correct an image shake caused by handshake of a user, whereby an image quality degradation can be prevented.

Another advantageous effect is that a bottom surface of a camera body is positioned with an area where an FPCB is folded to thereby reduce interference and rigidity of the FPCB, whereby an OIS driving operation can be smoothly carried out.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Hereinafter, exemplary embodiments of the present invention will be described in detail with reference to the accompanying drawings.

In describing the present invention, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, the camera module according to exemplary embodiments of the present invention will be described in detail with reference to the accompanying drawings.

Figure 1:
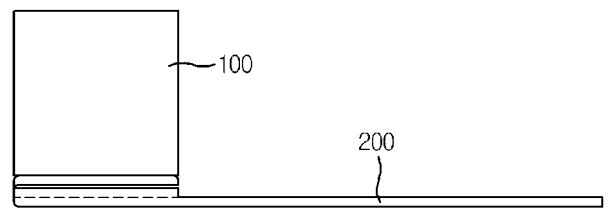
FIG. 1 is a mimetic lateral view illustrating a camera module according to an exemplary embodiment of the present invention.

FIG. 1 is a mimetic lateral view illustrating a camera module according to an exemplary embodiment of the present invention.

The camera module according to an exemplary embodiment of the present invention is equipped with a handshake correction unit to correct an image tremor (trembling, shake) caused by a user trembling, whereby deteriorated image quality can be prevented. Furthermore, the handshake correction unit can correct the image tremor caused by handshake by moving the camera module.

To be more specific, the handshake correction unit includes a driving unit of OIS (Optical Image Stabilizer) method moving the camera module in response to handshake information.

Figure 3:
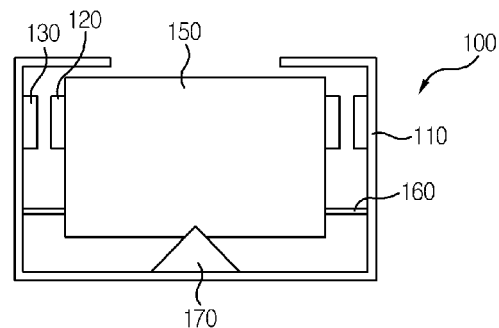
FIG. 3 is a schematic cross-sectional view illustrating a camera body of a camera module according to an exemplary embodiment of the present invention.

Referring to FIG. 3, a camera module according to an exemplary embodiment of the present invention includes a camera body (150), handshake correction units (120, 130) correcting an image tremor caused by handshake by moving the camera body (150), and an FPCB (Flexible Printed Circuit Board, 200) electrically connected to the camera body (150) and positioned at a bottom surface of the camera body (150).

That is, the camera body (150) moves along two axes of Y axis and X axis when an operation of moving the camera module in order to correct the image tremor by the handshake correction unit. Furthermore, the camera module is rotated about the Y and X axes. Thus, the camera module according to an exemplary embodiment of the present invention is advantageous in that a folded area of the FPCB (200) is positioned at a bottom surface of the camera body (150) to reduce interference and rigidity of the FPCB (200), whereby an OIS driving can be smoothly carried out.

Figure 2:
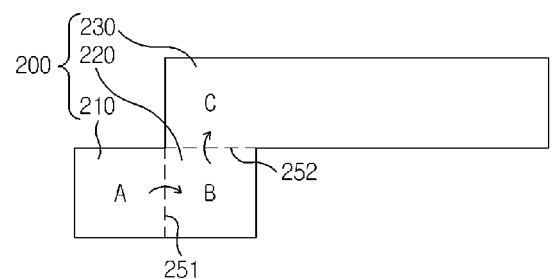
FIG. 2 is a plan view illustrating an FPCB of a camera module according to an exemplary embodiment of the present invention.

FIG. 2 is a plan view illustrating an FPCB of a camera module according to an exemplary embodiment of the present invention. As noted above, the FPCB (200) must be formed with a folded area for reducing rigidity of the FPCB (200). That is, the folded area of the FPCB (200) is formed at a connection unit connected to the camera body, and may be positioned at a bottom surface of the camera body.

Thus, as shown in FIG. 2, the FPCB (200) according to an exemplary embodiment of the present invention includes a first area (210) electrically connected to the camera body, a second area (220) connected and folded to the first area (210), and a third area (230) connected and folded to the second area (220).

At this time, the first and second areas (210, 220) may be situated on the same line, but the third area (230) may be formed on a line different from that of the first and second areas (210, 220). In other words, there exists a predetermined angle between a folded line (251) of the first and second areas (210, 220) and a folded line (252) of the second and third areas (220, 230). At this time, the folded lines (251, 252) may be defined as a line for being folded to an area of the first and second areas (210, 220) and to an area of the second and third areas (220, 230).

The first area (210) is an area electrically connected to the camera body, and the third area (230) is an area electrically connected to an external device or an external board, where an upper surface of the first area (210) is connected to the camera body.

As a result, a bottom surface of 'B' of the second area (220) is folded over a bottom surface 'A' of the first area (210), and an upper surface 'C' of the third area (230) is folded over an upper surface 'B' of the second area (220) to thereby reduce the rigidity of the FPCB (200) and to obtain a symmetry as well.

That is, the FPCB may be defined by a first connection unit connected to the camera body, a second connection unit connected to the first connection unit by being folded, and a third connection unit connected to the second connection unit by being folded, where the first area (210) may correspond to the first connection unit, the second area (220) may correspond to the second connection unit and the third area (230) may correspond to the third connection unit. Furthermore, the first, second and the third connection units are folded at a bottom surface of the camera module.

FIG. 3 is a schematic cross-sectional view illustrating a camera body of a camera module according to an exemplary embodiment of the present invention.

The camera module according to an exemplary embodiment of the present invention further comprises: a case (110) wrapping the camera body (150): and a driving unit installed on the camera body (150) and the case (110) to tilt the camera body (150), wherein the camera body (150) is embedded with a lens and an image sensor. The driving unit is a driving unit moving the camera body (150) in response to electromagnetic interaction, and may be directly formed on the camera module, or indirectly formed by being formed on a support unit separately installed outside of the camera body. The camera body (150) may further include an elastic unit (160) restoring the camera body (150) to an original position, in a case the electromagnetic interaction of the driving unit disappears.

The elastic unit (160) may be realized by a wire spring or a leaf spring connected to the camera body (150) and the case (110) and having an excellent restoring force of restoring to an original position, in a case the electromagnetic interaction of the driving unit disappears due to stop of power supply to a coil of the driving unit. The present invention is not limited thereto. The elastic unit (160) may be directly formed on the camera module or indirectly formed by being formed on a support unit separately installed outside of the camera body.

Furthermore, the elastic unit (160) is directly or indirectly connected to the case (110) and the camera body (150), and deformed to prevent the camera body (150) from moving when the driving unit is turned on, and restored to restore the camera body (150) to an original position when the driving unit is turned off. In consideration of this mechanism, the handshake correction unit restoring an image tremor caused by handshake includes the driving unit.

In addition, a groove (not shown) is formed at a center of a bottom surface of the camera body (150) to prevent a center of the camera body (150) from moving, and a structure inserted into the groove may be formed at the case (110). The groove and the structure function as a pivot (170) balancing the camera body (150) before and after the OIS driving. The groove may be formed at a separate support unit formed underneath the camera body (150). The elastic unit (160) may serve to support the camera body (150) on the pivot (170). The driving unit may be realized by a magnet (120) arranged on an external wall of the camera body (150) and a coil (130) distanced from the magnet (120) and wound on the case (110).

Furthermore, the driving unit may include a first driving unit tilting the camera module to a first axis, and a second driving unit tilting the camera module to a second axis. For example, each of the first and second driving units may be realized by a magnet arranged on an external wall of the camera body (150) and a coil distanced from the magnet and wound on the case (110).

Referring to FIG. 3, the first driving unit includes a magnet (120) arranged on an external wall of the camera body (150) and a coil (130) distanced from the magnet (120) and wound on the case (110), where the first driving unit can move to x axis direction based on the pivot (170). The second driving unit includes a magnet arranged on an external wall of the camera body (150) and a coil (130) distanced from the magnet (120) and wound on the case (110), where the second driving unit can move to y axis direction based on the pivot (170). Furthermore, the magnet may be directly arranged on the camera body (150), or indirectly arranged on a support unit separately formed on an outside of the camera body (150). The magnet and the coil may be oppositely arranged.

The magnet and the coil of the first driving unit are oppositely formed, and the magnet and the coil of the second driving unit are also oppositely formed. In a case a power is applied to the coil, a driving force is generated to x axis direction or to y axis direction in response to the electromagnetic interaction of the magnet and the coil. At this time, the camera body (150) is moved to the x-axis direction of to the y-axis direction based on the pivot (170), whereby the trembling phenomenon of the optical image of a subject incident on the camera body (150) can be corrected.

At this time, the first driving unit is distanced from the second driving unit to prevent magnetic forces of the first and second driving units from being mutually interfered.

For example, the first driving unit may be arranged on one surface of the case (110) and the camera body (150), and the second driving unit may be arranged on the other surface of the case (110) and the camera body (150).

Alternatively, the first driving unit may be arranged on two surfaces opposite to the one surface of the case (110) and the camera body (150), and the second driving unit may be arranged on two surfaces opposite to the other surface of the case (110) and the camera body (150), where the driving unit may be configured such that coils (121, 131) are arranged on an external wall of the camera body (150) or on an external wall of a separate support unit of the camera body (150), and magnets (122, 132) are arranged on the case (110).

Furthermore, magnets may be arranged on an external wall of the camera body (150) or on an external wall of a separate support unit of the camera body (150), and coils are arranged on the case.

That is, positions of the first and second driving units may be variably changed, such that it would be preferable to determine the positions of the first and second driving units where tremor of an optical image of a subject incident from the camera body (150) can be maximally corrected.

Figure 4:
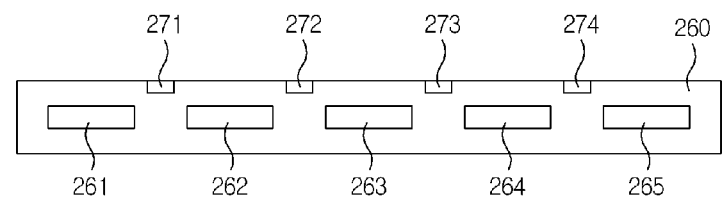
FIG. 4 is a schematic cross-sectional view illustrating an FPCB of a camera module according to an exemplary embodiment of the present invention.

FIG. 4 is a schematic cross-sectional view illustrating an FPCB of a camera module according to an exemplary embodiment of the present invention.

The FPCB of a camera module according to an exemplary embodiment of the present invention is arranged with a plurality of electrode lines (261, 262, 263, 264, 265), and includes a coating material (260) wrapping the plurality of electrode lines. The plurality of electrode lines (261, 262, 263, 264, 265) is connected at one end thereof to an electrical wiring of the camera body, and connected at the other end thereof to an external device or an external board to supply an electrical power to the camera module or apply a control signal, whereby the plurality of electrode lines (261, 262, 263, 264, 265) serves to transmit an electrical signal relative to an image of a subject obtained by the camera module to the external device or the external board.

Grooves (271, 272, 273, 274) are formed on the coating material (260) to allow the FPCB to be smoothly folded at lines because the FPCB must be assembled by being folded. The grooves (271, 272, 273, 274) are preferably positioned among the plurality of electrode lines (261, 262, 263, 264, 265) to prevent the plurality of electrode lines (261, 262, 263, 264, 265) from being affected in the course of coating. The grooves may take various shapes including a triangular shape, a square shape and a cylindrical shape respectively.

MODE FOR THE INVENTION

Figure 5:
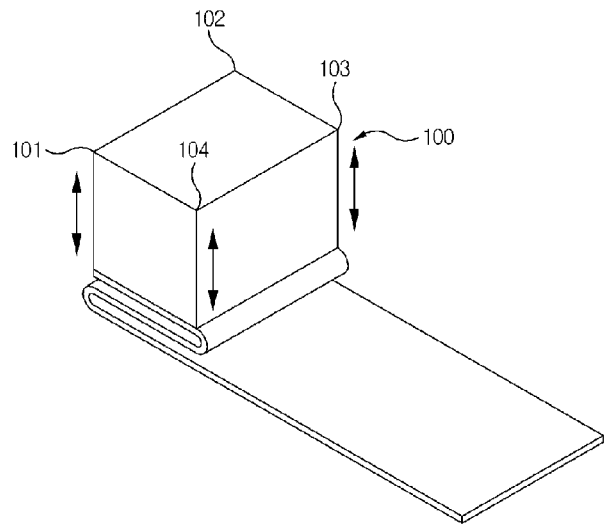
FIG. 5 is a mimetic perspective view illustrating operation of a camera module according to an exemplary embodiment of the present invention.
Figure 6:
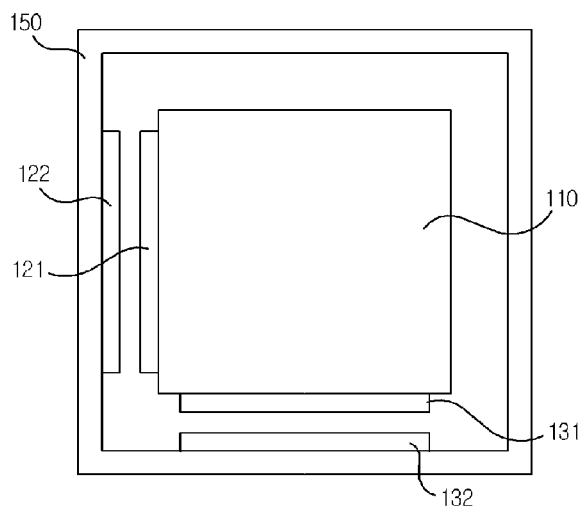
FIG. 6 is a mimetic perspective view illustrating configuration of a camera module according to an exemplary embodiment of the present invention.

FIG. 5 is a mimetic perspective view illustrating operation of a camera module according to an exemplary embodiment of the present invention, and FIG. 6 is a mimetic perspective view illustrating configuration of a camera module according to an exemplary embodiment of the present invention.

Referring to FIGS. 5 and 6, the camera module according to an exemplary embodiment of the present invention performs the correction using the handshake correction unit during OIS driving operation (i.e., when an image trembling caused by handshake is corrected). At this time, the handshake correction unit may include a driving unit that corrects by moving the camera body (150).

Thus, the camera body (150), at the time of OIS driving operation, moves to allow a bottom surface of the camera body (150) to be positioned at an area where the FPCB (200) is folded, whereby rigidity of the FPCB (200) is not affected. Therefore, influence by the FPCB (200) can be greatly reduced by the decreased rigidity of the FPCB (200). Furthermore, each apex (101, 102, 103, 104) of the camera body (150) is moved when the camera body (150) is moved by OIS driving operation. At this time, freedom of movement at the camera body (150) can be increased by the area where the FPCB (200) is folded.

For example, as illustrated in FIG. 6, in a case the coils (121, 131) are arranged on an external wall of the camera body (150) or on one surface of an external wall at a separate support unit of the camera body, and the magnets (122, 123) are arranged on the case (110) of opposite surface, the camera module is moved by the mutual electromagnetic interaction between the coils (121, 131) and the magnets (122, 132) to correct the image trembling. Alternatively, the coils (121, 131) and the magnets (122, 132) may be oppositely arranged on the case (110), the camera body (150) or the separate support unit installed on the camera body (150).

Figure 7:
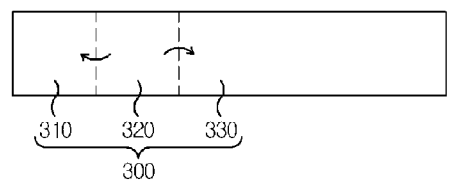
FIG. 7 is a plan view illustrating an FPCB of a camera module according to another exemplary embodiment of the present invention.
Figure 8:
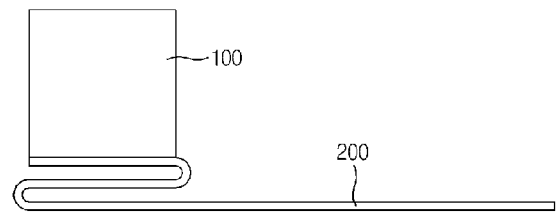
FIG. 8 is a mimetic lateral view of a camera module illustrated in FIG. 7.

At this time, the coil (121) and the magnet (122) function to move the camera body to a first axis, while the coil (131) and the magnet (132) serve to move the camera body (150) to a second axis, where the first and second axes are respectively the x-axis and y-axis. Furthermore, the first driving unit may be arranged on a surface corresponding to the one surface, and the second driving unit may be arranged on a surface corresponding to the other surface FIG. 7 is a plan view illustrating an FPCB of a camera module according to another exemplary embodiment of the present invention, and FIG. 8 is a mimetic lateral view of a camera module illustrated in FIG. 7.

Referring to FIG. 6, the camera module according to another exemplary embodiment of the present invention includes a first area (310) electrically connected to the camera body, a second area (320) connected and folded to the first area (310), and a third area (330) connected and folded to the second area (320), where the first, second and third areas (310, 320, 330) are connected in a row. That is, the first, second and third areas (310, 320, 330) are on the same line.

The FPCB is configured such that a bottom surface of the second area (320) is so folded as to oppositely face a bottom surface of the first area (310), and an upper surface of the third area (330) is so folded as to oppositely face an upper surface of the second area (320). Thus, the camera module having the FPCB (200) thus folded may be formed with a lateral surface as shown in FIG. 8.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that a bottom surface of a camera body is positioned with an area where an FPCB is folded to thereby reduce interference and rigidity of the FPCB, whereby an OIS driving operation can be smoothly carried out.

The invention claimed is:

1. A camera module, comprising:
   a case wrapping a camera body;
   a handshake correction unit installed on the camera body and configured to correct an image shake caused by handshake, wherein the handshake correction unit includes a first driving unit to move in a first direction and a second driving unit distanced from the first driving unit to move in a second direction; and
   a Flexible Printed Circuit Board (FPCB) folded and positioned under the camera body and electrically connected to the camera body;
   wherein the FPCB includes a first connection unit, a second connection unit connected and folded to the first connection unit, and a third connection unit connected and folded to the second connection unit, the third connection unit being electrically connected to an external device;
   wherein the first and second connection units are situated on a first line and the third connection unit is situated on a second line parallel to the first line;
   wherein a folded line between the first and second connection units is perpendicular to a folded line between the second and third connection units;
   wherein the first, second, and third connection units are folded at a bottom surface of the camera body;
   wherein a bottom surface of the second connection unit is folded over a bottom surface of the first connection unit, and an upper surface of the third connection unit is folded over an upper surface of the second connection unit; and
   wherein the FPCB includes a coating material arranged with a plurality of electrode lines and wrapping the plurality of electrode lines.

2. The camera module of claim 1, wherein the handshake correction unit includes a driving unit correcting the image shake by tilting the camera body.

3. The camera module of claim 1, further comprising: a case wrapping the camera body, and a driving unit installed on the camera body and the case to tilt the camera body, wherein the camera body is embedded with a lens and an image sensor.

4. The camera module of claim 3, wherein the driving unit tilts the camera body by electromagnetic interaction.

5. The camera module of claim 4, further comprising an elastic unit that restores the camera body to an original position in case the electromagnetic interaction of the driving unit disappears.

6. The camera module of claim 5, wherein the elastic unit is connected to the camera module and the case.

7. The camera module of claim 5, wherein the elastic unit is a wire spring or a leaf spring.

8. The camera module of claim 3, wherein the camera body is formed at a center of a bottom surface with a groove, where a structure inserted into the groove is formed at the case.

9. The camera module of claim 3, wherein the driving unit includes a magnet installed at an external wall of the camera body, and a coil distanced from the magnet to be wound on the case.

10. The camera module of claim 3, wherein the driving unit includes a first driving unit tilting the camera body to a first axis, and a second driving unit tilting the camera body to a second axis.

11. The camera module of claim 1, wherein the coating material is formed with well-foldable grooves.

12. The camera module of claim 11, wherein each of the grooves is positioned between neighboring electrode lines of the plurality of electrode lines.

\* \* \* \* \*